US008730803B2

United States Patent
Karaoguz et al.

(10) Patent No.: US 8,730,803 B2
(45) Date of Patent: *May 20, 2014

(54) QUALITY OF SERVICE SUPPORT IN A MEDIA EXCHANGE NETWORK

(71) Applicants: Jeyhan Karaoguz, Irvine, CA (US); James D. Bennett, Hroznetin (CZ)

(72) Inventors: Jeyhan Karaoguz, Irvine, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/724,696

(22) Filed: Dec. 21, 2012

(65) Prior Publication Data

US 2013/0117411 A1 May 9, 2013

Related U.S. Application Data

(63) Continuation of application No. 13/296,363, filed on Nov. 15, 2011, now Pat. No. 8,358,582, which is a continuation of application No. 10/675,903, filed on Sep. 30, 2003, now Pat. No. 8,059,537.

(60) Provisional application No. 60/478,528, filed on Jun. 13, 2003, provisional application No. 60/467,867, filed on May 5, 2003, provisional application No. 60/464,711, filed on Apr. 23, 2003, provisional application No. 60/457,179, filed on Mar. 25, 2003, provisional application No. 60/444,243, filed on Jan. 30, 2003, provisional application No. 60/444,099, filed on Jan. 30, 2003, provisional application No. 60/443,897, filed on Jan. 30, 2003, provisional application No. 60/443,894, filed on Jan. 30, 2003, provisional application No. 60/443,996, filed on Jan. 30, 2003, provisional application No. 60/432,472, filed on Dec. 11, 2002.

(51) Int. Cl.
- H04L 1/20 (2006.01)
- H04L 12/28 (2006.01)
- H04L 12/56 (2006.01)
- G06F 15/177 (2006.01)

(52) U.S. Cl.
USPC ........ 370/231; 370/235; 370/395.2; 370/400; 709/223

(58) Field of Classification Search
USPC ................. 370/229–240, 252–253, 332, 419, 370/400–401; 709/208–211, 220–229, 212, 709/217, 219, 230; 725/86, 91, 100, 103
See application file for complete search history.

(56) References Cited

U.S. PATENT DOCUMENTS

| | | | |
|---|---|---|---|
| 6,253,246 B1 * | 6/2001 | Nakatsuyama | 709/233 |
| 6,539,548 B1 * | 3/2003 | Hendricks et al. | 725/109 |
| 6,763,226 B1 * | 7/2004 | McZeal, Jr. | 455/90.2 |

(Continued)

*Primary Examiner* — Tri H Phan
(74) *Attorney, Agent, or Firm* — Garlick & Markison; Bruce E. Garlick

(57) ABSTRACT

A method for controlling communication of media content by a network device in a communication network includes providing, by the network device, a plurality of quality of service options corresponding to at least one media file selected for communication to a remote user via a communication channel; receiving a quality of service selection specifying at least one of the plurality of quality of service options; and communicating the at least one media file to the remote user utilizing the received quality of service selection. The providing may include displaying, by the network device, the plurality of quality of service options. At least a portion of specified parameters may be transferred to a first communication device coupled to the communication network. At least a portion of the communication channel may be configured by a second device utilizing the transferred at least portion of the specific parameters.

20 Claims, 12 Drawing Sheets

(56) References Cited

U.S. PATENT DOCUMENTS

| | | | |
|---|---|---|---|
| 6,973,475 B2 * | 12/2005 | Kenyon et al. | 709/203 |
| 7,734,788 B2 * | 6/2010 | Karaoguz et al. | 709/226 |
| 8,321,570 B2 * | 11/2012 | Karaoguz et al. | 709/226 |
| 8,358,582 B2 * | 1/2013 | Karaoguz et al. | 370/230.1 |
| 2002/0129036 A1 * | 9/2002 | Ho Yuen Lok et al. | 707/104.1 |
| 2002/0144276 A1 * | 10/2002 | Radford et al. | 725/87 |
| 2003/0040962 A1 * | 2/2003 | Lewis | 705/14 |
| 2008/0040354 A1 * | 2/2008 | Ray et al. | 707/10 |

\* cited by examiner

| CHANNELS | << 1PM | 2PM | ... | 6PM | 7PM >> |
|---|---|---|---|---|---|
| | | | HOUR, DAY | | |
| Family Vacations | | | | | |
| Kids sports | | | | | |
| ... | | | | | |
| Vacation in Alaska Video  802 | Normal Estimated Delivery Time: 2 Hrs 13 mins Cost: $0.59 (Without Queuing) | | | Showing All day (48 mins) Earliest Order Time: 4:00 PM MPEG-2, 1.5 Mbps | |
| Vacation in Alaska Video  803 | Express Estimated Delivery Time: 18 mins Cost: $1.20 (With Queuing) | | | Showing All day (48 mins) Earliest Order Time: 4:00 PM MPEG-2, 4 Mbps | |
| Vacation in Alaska Video  804 | Overnight Delivery: available Next Morning Cost: $0.05 (Server Stored) | | | Showing All day (48 mins) Earliest Order Time: 4:00 PM MPEG-2, 19 Mbps | |

Fig. 8

QUALITY OF SERVICE SUPPORT IN A MEDIA EXCHANGE NETWORK

CROSS-REFERENCE TO RELATED APPLICATIONS/INCORPORATION BY REFERENCE

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:
1. U.S. Utility application Ser. No. 13/296,363 entitled "Quality of Service Support in a Media Exchange Network,"filed Nov. 15, 2011, co-pending, which claims priority pursuant to 35 U.S.C. §120, as a continuation, to U.S. Utility patent application Ser. No. 10/675,903 entitled "Quality of Service Support in a Media Exchange Network," filed Sep. 30, 2003, issued as U.S. Pat. No. 8,059,537 on Nov. 15, 2011, which makes reference to, claims priority to, and claims the benefit of:

U.S. Provisional Application Ser. No. 60/432,472 filed Dec. 11, 2002;
U.S. Provisional Application Ser. No. 60/443,894 filed Jan. 30, 2003;
U.S. Provisional Application Ser. No. 60/457,179 filed Mar. 25, 2003;
U.S. Provisional Application Ser. No. 60/478,528 filed Jun. 13, 2003;
U.S. Provisional Application Ser. No. 60/443,897 filed Jan. 30, 2003;
U.S. Provisional Application Ser. No. 60/444,099 filed Jan. 30, 2003;
U.S. Provisional Application Ser. No. 60/443,996 filed Jan. 30, 2003;
U.S. Provisional Application Ser. No. 60/444,243 filed Jan. 30, 2003;
U.S. Provisional Application Ser. No. 60/464,711 filed Apr. 23, 2003; and
U.S. Provisional Application Ser. No. 60/467,867 filed May 5, 2003.

This application also makes reference to:
U.S. application Ser. No. 10/657,390 filed Sep. 8, 2003; and
U.S. application Ser. No. 10/660,267 filed Sep. 11, 2003.

All of the above stated applications are incorporated herein by reference in their entirety.

FIELD OF THE INVENTION

Certain embodiments of the invention relate to providing a service in a communication network. In particular, certain embodiments of the invention relate to a method and system for providing quality of service in a communication network.

BACKGROUND OF THE INVENTION

Today, files having different display sizes and levels of resolution for images and video may be attached to e-mail messages using a personal computer (PC) and sent to other personal computers via the Internet or an intranet. Also, files may be sent from one location to another over a network, for example, a local area network (LAN) or a wide area network (WAN) utilizing file transfer protocol (FTP) or other protocols. The files may be utilized in conjunction with certain media players such as personal computers, digital versatile disc (DVD) players, personal digital assistants (PDAs), handheld computers and personal computer tablets, for example.

Depending on the size of a video file or an image file, the content may be displayed in different resolution, color content and/or display size. Files are often sent from a source location to a destination location without addressing a consumption quality of the file. Exemplary consumption quality characteristics or media parameters, may include, display resolution, amount of bandwidth to be utilized to transfer the file, the time required to transfer the file, and any cost that may be associated with transferring the file.

For example, a source system such as a personal computer may attempt to send a high-resolution image file to a destination system such as a personal computer over a low bandwidth network, for example, using a dial-up service with a 56K modem. Often, on such networks, throughput is much less that 56Kbps and as a result, higher resolution image files may require a significantly greater amount of time to facilitate file transfer. The image file may be a very large file of the order of megabits and may not be compressed any further. In this regard, the high-resolution image file may take a significantly greater amount of time to be transferred from the source personal computer to the destination personal computer. Accordingly, a higher bandwidth network connection, for example, a fiber optic network or Ethernet network may be required to transfer the image file in a relatively short amount of time and may cost more than a low bandwidth connection such as a dialup-connection.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Certain aspects of the invention may be found in a method and system for controlling a transfer of media content in a communication network. The method for controlling transfer of media content in a communication network may comprise the step of receiving an input specifying at least one media file to be transferred via a communication channel in the communication network. A selection specifying various quality of service (QoS) parameters to be utilized for transferring of one or more of the media files via the communication channel may also be received. Accordingly, one or more of the media files may be transferred via the communication channel utilizing at least some of the quality of service selection.

In accordance with an embodiment of the invention, at least a portion of the specified parameters may be transferred to a first communication device that is coupled to the communication network. The second device may utilize at least a portion of the transferred parameters to configure at least a portion of the communication channel. The first communication device may be a broadband headend or a media server. Notwithstanding, the received input specifying one or more media files to be transferred may be generated and selected from a media guide, channel guide or a device guide. In this regard, generating and/or selecting the received input may be achieved from, for example, a television screen within a home. The method may further comprise queuing and/or buffering at least a portion of the selected media files during transfer of the media files.

A cost associated with the quality of service selections that are utilized to transfer the media file via the communication channel may be presented to a user via, for example, a television screen within a home. The cost may be varied depending on the selected parameters that are utilized to specify the selected quality of service. Exemplary parameters that may be utilized for transferring the selected media files may comprise a resolution, color content, encoding type, encoding rate, compression type, display size, bandwidth required to transfer the selected media file, a time required for the transfer, and a cost of the transfer.

Another embodiment of the invention may provide a machine-readable storage, having stored thereon, a computer program having at least one code section for controlling the transfer of media content in a communication network. The at least one code section may be executable by a machine, thereby causing the machine to perform the steps as described above for controlling the transfer of media content in a communication network.

Aspects of the system for controlling the transfer of media content in a communication network may comprise at least one processor that receives an input specifying at least one media file to transfer via a communication channel in the communication network. The processor may also receive a selection specifying various quality of service (QoS) parameters that are to be utilized for the transfer one or more of the media files via the communication channel. Accordingly, one or more of the media files may be transferred by the processor via the communication channel utilizing at least some of the selected quality of service parameters.

In accordance with an embodiment of the invention, the processor may transfer at least a portion of the specified parameters to a first communication device that is coupled to the communication network. The first communication device may be a broadband headend or a media server. In any case, the second device may utilize at least a portion of the transferred parameters to configure at least a portion of the communication channel. In another aspect of the invention, the input received by the processor specifying one or more media files that are to be transferred may be generated and selected from a media guide, channel guide or a device guide. In this regard, the received input selection may be generated from, for example, a television screen within a home. The processor may be further adapted to queue and/or buffer at least a portion of the selected media files while transferring the media files.

A cost associated with the quality of service selections that are utilized to transfer the media file via the communication channel may be presented by the processor to a user via, for example, a television screen within a home. The processor may be configured to vary the cost depending on the selected parameters that are utilized to specify the selected quality of service. Exemplary parameters that may be utilized to transfer the selected media files may comprise a resolution, color content, encoding type, encoding rate, compression type, display size, bandwidth required to transfer the selected media file, a time required for the transfer, and a cost of the transfer. The processor may be a media processing system processor, a media management system processor, a computer processor, a media exchange software processor and/or a media peripheral processor.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 8 is an exemplary illustration of a TV guide channel user interface showing several options of a pushed media in accordance with an embodiment of the present invention.

DETAILED DESCRIPTION OF THE INVENTION

Various aspects of the invention may be found in a method and system for controlling transfer of media content in a communication network. The method for controlling transfer of media content in a communication network may comprise receiving an input specifying at least one media file that is to be transferred via a communication channel in the communication network. Based on a received selection specifying various quality of service (QoS) parameters to be utilized to transfer one or more of the media files, one or more of the media files may be transferred via the communication channel utilizing at least some of the received quality of service parameter selections. At least a portion of the specified parameters may be transferred to a first communication device such as a broadband headend or a media server that is coupled to the communication network. The second device may utilize at least a portion of the transferred parameters to configure at least a portion of the communication channel.

In accordance with an aspect of the invention, the received input specifying one or more media files to be transferred may be generated and selected from a media guide, channel guide or a device guide displayed on a television screen within a home. At least a portion of the selected media files may be queued and/or buffered while being transferred. A cost associated with the quality of service selections that are used to transfer the media file via the communication channel may be presented to a user via, for example, a television screen within a home. The cost may be varied depending on the selected parameters that are utilized to specify the selected quality of service. Exemplary parameters for transferring the selected media files may include, but are not limited to, a resolution, color content, encoding type, encoding rate, compression type, display size, bandwidth required to transfer the selected media file, a time required for the transfer, and a cost of the transfer.

Figure 1:
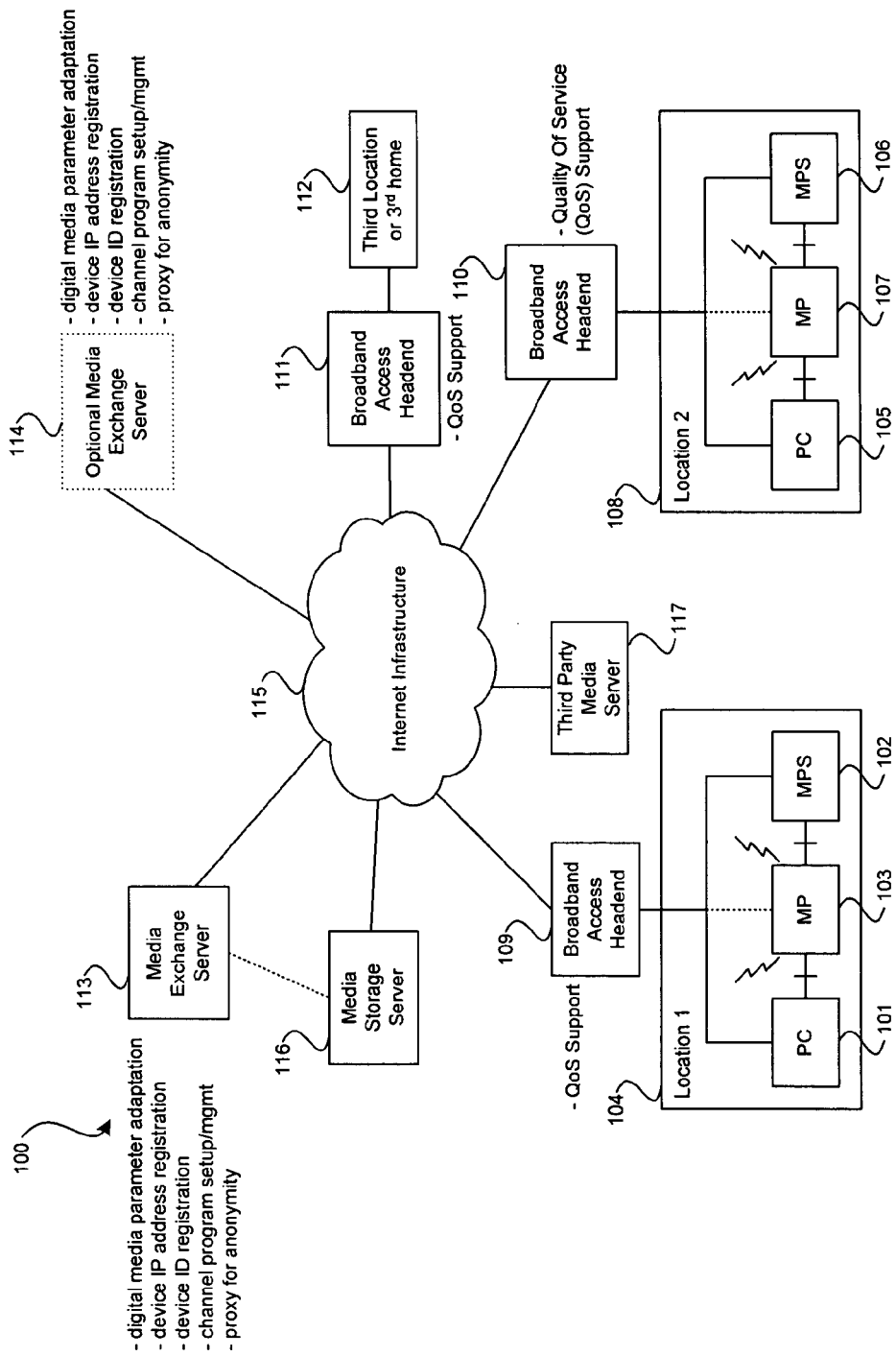
FIG. 1 is a diagram illustrating an embodiment of a media exchange network 100 that may be utilized in connection with providing quality of service (QoS) support, in accordance with various aspects of the invention.

FIG. 1 is a diagram illustrating an embodiment of a media exchange network 100 that may be utilized in connection with providing quality of service (QoS) support, in accordance with various aspects of the invention. Specifically, the media exchange network 100 may be a communication network comprising a personal computer (PC) 101, a media processing system (MPS) 102, and at least one media peripheral (MP) 103 at a first location 104. The first location may be a first home, for example. Additionally, a personal computer 105, a media processing system 106, and at least one media peripheral 107 may be located at a second location 108. The second location 108 may be a home. The media peripheral 103 may interface with the personal computer 101 and/or the media processing system 102 via, for example, a wireless link and/or a wired link. The wired link may be a universal serial bus (USB) or a Firewire (IEEE 1394) connection. A personal computer comprising media exchange software (MES) running on or being executed by the personal computer, may also be referred to as a media processing system.

The personal computer 101 and the media processing system 102 may interface with a broadband access headend 109. The broadband access headend 109 may comprise a cable headend, a satellite headend, and/or a digital subscriber line (DSL) headend, in accordance with various embodiments of the invention. Optionally, the media peripheral 103 may interface with the broadband access headend 109. The personal computer 101, media processing system 102, and/or media peripheral 103 may include internal modems such as a cable modem or DSL modem, or other interface devices in order to communicate with the broadband access headend 109. Optionally, the interface device such as a modem may be external to the personal computer 101, media processing system 102, and media peripheral 103.

Similarly, the media peripheral 107 may interface with the personal computer 105 and/or the media processing system 106 via, for example, a wireless link and/or a wired link such as a USB or Firewire (IEEE 1394) connection. The personal computer 105 and the media processing system 106 may interface with a broadband access headend 110. The broadband access headend 110 may include a cable headend, a satellite headend, or a DSL headend, in accordance with various embodiments of the present invention. Optionally, the media peripheral 107 may interface with the broadband access headend 110. The personal computer 105, media processing system 106, and/or media peripheral 107 may include internal modems such as a cable modem or DSL modem, or other interface device in order to communicate with the broadband access headend 110. Optionally, the interface device such as a modem may be external to the personal computer 105, media processing system 106, and media peripheral 107.

A media processing system may also comprise a set-top-box (STB), a personal computer, and/or a television with a media management system (MMS). A media management system may also be referred to as a media exchange software (MES) platform. Notwithstanding, a media management system may include a software platform operating on at least one processor that may provide certain functionality including user interface functionality, distributed storage functionality, networking functionality, and automatic control and monitoring of media peripheral devices. For example, a media management system may provide automatic control of media peripheral devices, automatic status monitoring of media peripheral devices, and inter-home media processing system routing selection. A media processing system may also be referred to as a media-box and/or an M-box. Any personal computer may indirectly access and/or control any media peripheral device in instances where the personal computer may include a media management system. Such access and/or control may be accomplished through various communication pathways via the media processing system or outside of the media processing system. A media processing system may also have the capability to automatically access and control any media peripheral device without user interaction and/or with user intervention. A personal computer (PC) may include media exchange software running on or being executed by the personal computer and may be referred to as a media processing system. The media processing system may also include a speech recognition engine that may be adapted to receive input speech and utilize the input speech control various functions of the media processing system.

Each of the elements or components of the network for communicating media or media exchange network may be identified by a network protocol address or other identifier which may include, but is not limited to, an Internet protocol (IP) address, a media access control (MAC) address and an electronic serial number (ESN). Examples of elements or components that may be identified by such addresses or identifiers may include media processing systems, media management systems, personal computers, media or content providers, media exchange software platforms and media peripherals.

The media exchange network 100 may further include a broadband access headend 111 that may be connected between a third location 112, an Internet infrastructure 115 and a media exchange server 113. In one aspect of the invention, a single central server may support the media exchange network 100. However, the invention is not so limited, and at least one other media exchange server 114 may optionally support the media exchange network 100 that is coupled to Internet infrastructure 115. This optional arrangement may be referred to as a multiserver arrangement. Accordingly, an embodiment of the present invention may include two or more media exchange servers strategically located at various locations in the media exchange network 100.

The broadband access headends 109 and 110 may also interface to the Internet infrastructure 115. The broadband access headend 111 may include a cable headend, a satellite headend, or a DSL headend, in accordance with various embodiments of the invention. The third location 112 may also include a personal computer, a media peripheral system, and/or a media peripheral as part of the media exchange network 100. The third location may be a home, for example.

The media exchange network may also include a media storage server 116 and a third ($3^{rd}$) party media server 117, both interfacing to the Internet infrastructure 115. The media storage server 116 may interact with the media exchange server 113 and may provide temporary and/or archival storage for digital media on the media exchange network 100. For example, the media storage server 116 may temporarily store media files that are addressed to certain media peripheral systems and/or personal computers on the media exchange network 100. The third ($3^{rd}$) party arty media server 117 may store movies, video, user profiles, and other digital media that may be provided to users of the media exchange network 100.

In accordance with an alternative embodiment of the invention, a broadband access headend may be upgraded to a media exchange headend by adding functionality to facilitate the exchange of media on the media exchange network in conjunction with the media exchange server. Such functionality may include distributed networking capability and archival or long term media storage functionality, storage management and digital rights management. Temporary storage may be utilized to aid in the distribution and routing of media storage management, and digital rights management.

The media exchange server architecture may solve the problem of communication between a device such as a first media peripheral system, a first personal computer and a first media peripheral at a first home and second device such as a second media peripheral system, a second PC and a second media peripheral at another home over the media exchange network 100. The media exchange servers 113 and 114 may provide functionality on the media exchange network 100 including device registration, channel/program setup and management, and/or security.

The various elements of the media exchange network 100 may include storage locations for digital media and data. The storage locations may include, for example, hard disk drives, a digital versatile disc (DVD) player, a compact disc (CD) player, floppy disk drives, RAM, or any combination of these. The storage locations may also include, for example, CompactFlash™, SmartMedia™, Memory Stick™, Secure Digital™, MultiMedia, PCMCIA, or any combination thereof.

The personal computers 101, 105 may include desktop PC's, PC tablets, notebook PC's, handhelds, PDA's, or any computing device. The media processing systems 102, 106 may be regarded as essentially enhanced set-top-boxes. The media processing systems 102, 106 may each include a television screen or monitor for viewing and interacting with various user interfaces, media, data, and services that may be available on the media exchange network. A remote control or pointing device may be utilized for control and/or navigation during viewing and/or interaction. The personal computers 101 and 105 may each include a monitor for viewing and/or interacting with various user interfaces, media, data, and services that may be available on the media exchange network using, for example, a keyboard and/or mouse. The media processing systems, personal computers, and/or media peripherals may include functional software that may support interaction with the media exchange servers and media peripherals on the media exchange network 100, in accordance with various embodiments of the invention.

The media peripherals 103, 107 of the media exchange network 100 may include, for example, a digital camera, a digital camcorder, an MP3 player, a home juke-box system, a personal digital assistant (PDA), a multi-media gateway device, and various home appliances. The media peripherals 103, 107 of the media exchange network 100 may include legacy media peripherals which are those media peripherals that are in existence today and are not fully compatible with the media exchange technology in accordance with various aspects of the invention. The media peripherals 103, 107 may also include new non-legacy media peripherals which may not be on the market yet or which are on the market but in either case will be fully compatible with the technology. A legacy media peripheral may not have the software or interface to interact directly with a media processing system on a media exchange network.

In accordance with an embodiment of the present invention, quality of service (QoS) may be affected by at least the resolution content, the display size, and the color/grey-scale content of a media file, the bandwidth used to transfer a media file, the time to transfer a media file, and the cost to transfer a media file. Media content transferred across a media exchange network often includes images and video having different digital media parameters supporting different levels of image and display quality. Display quality may also include audio quality such as encoding bit rate.

In a media exchange network, media content is typically transferred from one user to another in a channelized manner. In this regard, the media content may be incorporated within a channel format and the contents of the channel may be pushed or otherwise communicated from one user to another via a communication network. In accordance with an embodiment of the invention, a user of the media exchange network may select a quality of service (QoS) when incorporating media content into a channel format before pushing or otherwise communicating the media via the channel to another user over the media exchange network. For example, a user may select exemplary media parameters such as resolution content, color content, encoding type, and display size of the media content file. The user may also select a bandwidth to be utilized to transfer the media content file over the media channel on the media exchange network. Other media parameters that may be selected may include a time to transfer the media content file, and a cost for transferring the media content file based on the selection media parameters. Bandwidth, time, and cost may usually be interdependent. For example, selecting a certain time to transfer a particular file such as a ten (10) Gigabyte video file within 1 hour may, by definition, require a bandwidth of 1 GHz and cost $10.

Figure 2:
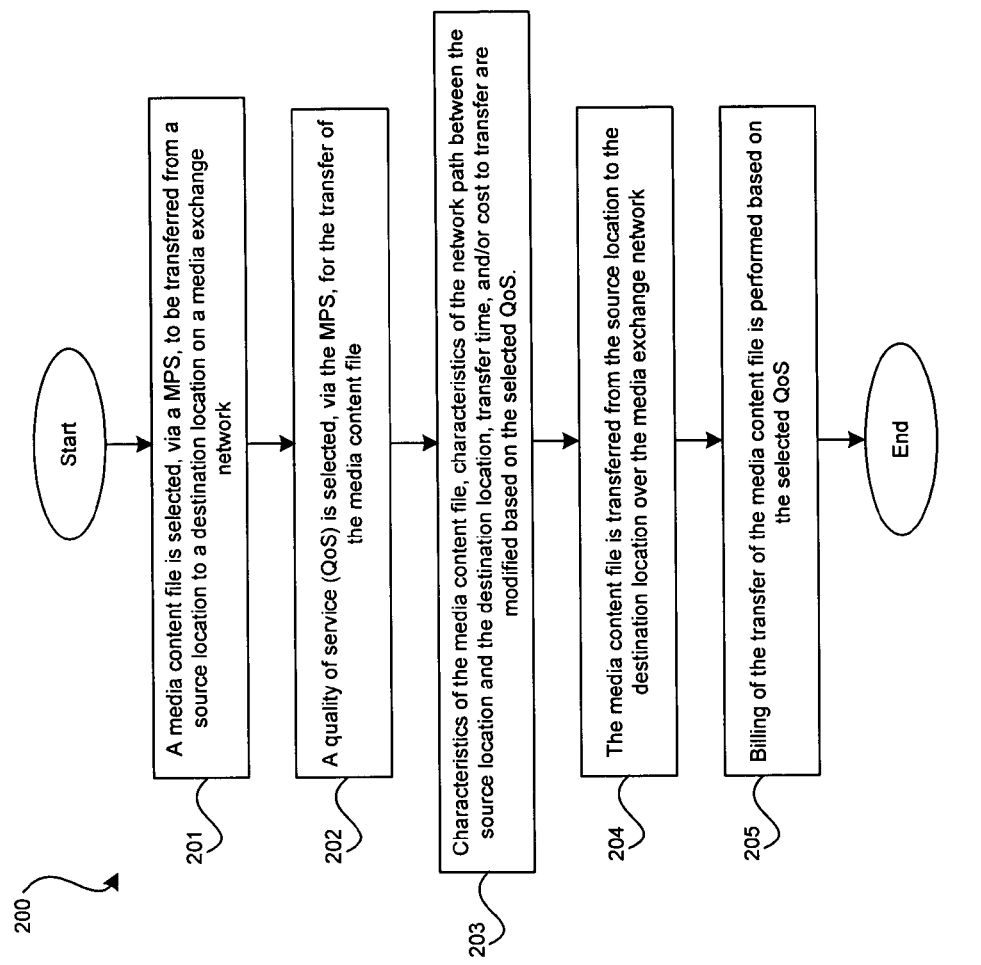
FIG. 2 is a flowchart illustrating exemplary steps of a method that may be utilized to provide quality of service support on the media exchange network of FIG. 1, in accordance with various aspects of the present invention.

FIG. 2 is a flowchart illustrating exemplary steps of a method that may be utilized to provide quality of service support on the media exchange network of FIG. 1, in accordance with various aspects of the present invention. Referring to FIG. 2, in step 201, a media content file is selected, via a media processing system, to be transferred from a source location to a destination location on a media exchange network. In step 202, a quality of service (QoS) is selected, via the media processing system, for the transfer of the media content file. In step 203, characteristics of the media content file, characteristics of a network path between the source location and the destination location, transfer time, and/or cost to transfer are modified based on the selected quality of service. In step 204, the media content file is transferred from the source location to the destination location over the media exchange network according to the selected quality of service. In step 205, billing for the transfer of the media content file is performed based on the selected quality of service.

In an illustrative embodiment of the invention, referring to FIG. 1, a user at the second ($2^{nd}$) home 108 may have a desire to transfer a media content file, using the media processing system 106, to the media processing system 102 at the first ($1^{st}$) home 104. The media content file may comprise a digital video file. The user selects the media content file using the media processing system 106. The user may then select a quality of service which defines the conditions under which the media content file is to be transferred. Selecting the quality of service options may cause the media content file to be transferred to the media processing system 102 within one (1) hour, at the highest resolution, the largest display size, with the maximum color content, and over a high bandwidth path through the media exchange network 100. The cost for this selected quality of service may be $10, for example.

In accordance with an aspect of the invention, the broadband access headend 110 may be adapted to provide quality of service support by modifying the characteristics of the media content file that is the be transferred. Exemplary characteristics that may be modified by the broadband access headend 110 may include media content file resolution, color content, display size, encoding and the characteristics of the network path between the media processing system 106 and the media processing system 102. In the latter case, the exemplary characteristics may also define the bandwidth that is to be utilized between the media processing system 106 and the media processing system 102 to transfer the media content file within, for example, a one (1) hour time period.

In accordance with another embodiment of the present invention, quality of service support may be provided by the media exchange server 113 on the media exchange network 100. Whenever a media content file is to be transferred from a source location to a destination, the media exchange server 113 may serve as an intermediary to process the media content file and set up the network path according to the selected quality of service. The media exchange server coordinates the transfer of the media content file in a channel.

As another exemplary embodiment of the invention, with reference to FIG. 8, a user of the media exchange network may push or otherwise communicate media such as "Vacation in Alaska Video" over a media channel to a friend who may be on the same media exchange network. A media guide user interface 800 may provide the user with the capability to select several quality of service (QoS) options or parameters 801 that may define how media may be pushed and/or otherwise transferred to over a media channel. U.S. patent application Ser. No. 10/675,382 filed Sep. 30, 2003 and U.S. patent application Ser. No. 10/675,467 filed Sep. 30, 2003 also provides exemplary media view or guide, device view or guide, and channel view or guide, and are incorporated herein by reference in their entirety.

In an illustrative embodiment of the invention, a first, most expensive option 803 may be "Express Delivery" which delivers the media content via the media channel to the friend in 18 minutes using queuing at a cost $1.20, for example. The pushed or otherwise communicated media content may be stored in a file in an MPEG-2 format that was recorded at a rate of 4 Mbps, for example. Queuing may comprise buffering and delivering a previous part of the media and then buffering and delivering a next part of the media. For example, a first ($1^{st}$) six (6) minutes of the "Vacation in Alaska Video" may be buffered and delivered first, then a second ($2^{nd}$) six (6) minutes may be buffered and delivered next, and so on until the entire media is delivered.

A second, less expensive option 802 may be "Normal Delivery" which may deliver the media channel in two (2) hours and thirteen (13) minutes without queuing and cost $0.59, for example. The pushed media content may be stored in a file in an MPEG-2 format that was recorded at a rate of 1.5 Mbps, for example.

A third, least expensive option 804 may be "Overnight Delivery" which would deliver the media channel by the next morning and cost only $0.05, for example. The pushed media content may be stored in a file in an MPEG 2 format that was recorded at a rate of 19 Mbps and stored on a server, for example.

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a media guide user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top-boxes or integrated MPS's (media processing systems) may be used with the media exchange network to perform all of the previously described media exchange functions using a remote control with a television screen.

Current set-top-boxes may be software enhanced to create a MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
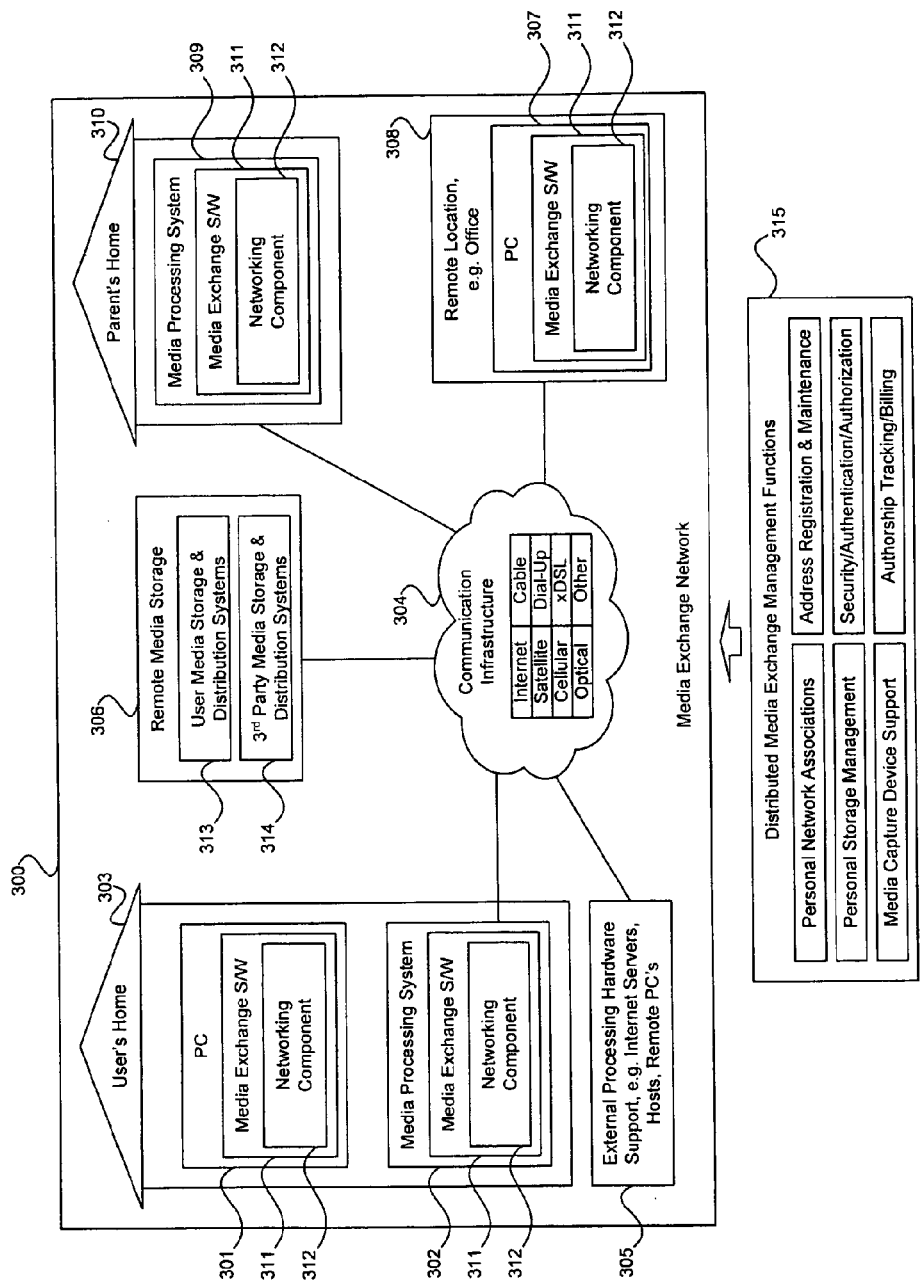
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated media guide interface providing a TV channel guide look-and-feel.

The external processing hardware support 305 comprises at least one server such as a centralized internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
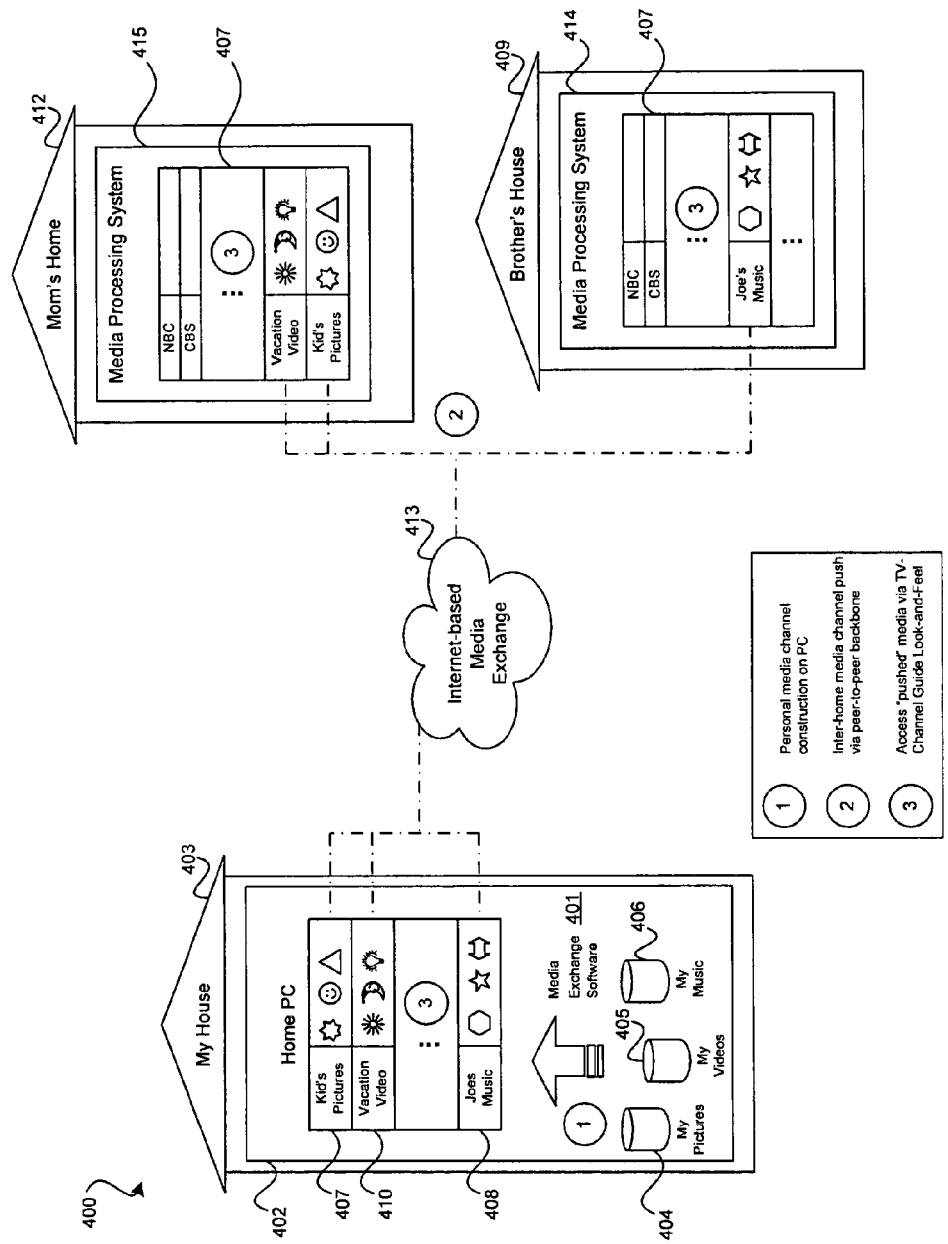
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a media guide user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a media guide user interface 407.

In step 3, brother and/or Mom access the pushed media channels via their respective media processing systems (MPS's) 414 and 415 using their respective MPS TV screens and remote controls.

Figure 5:
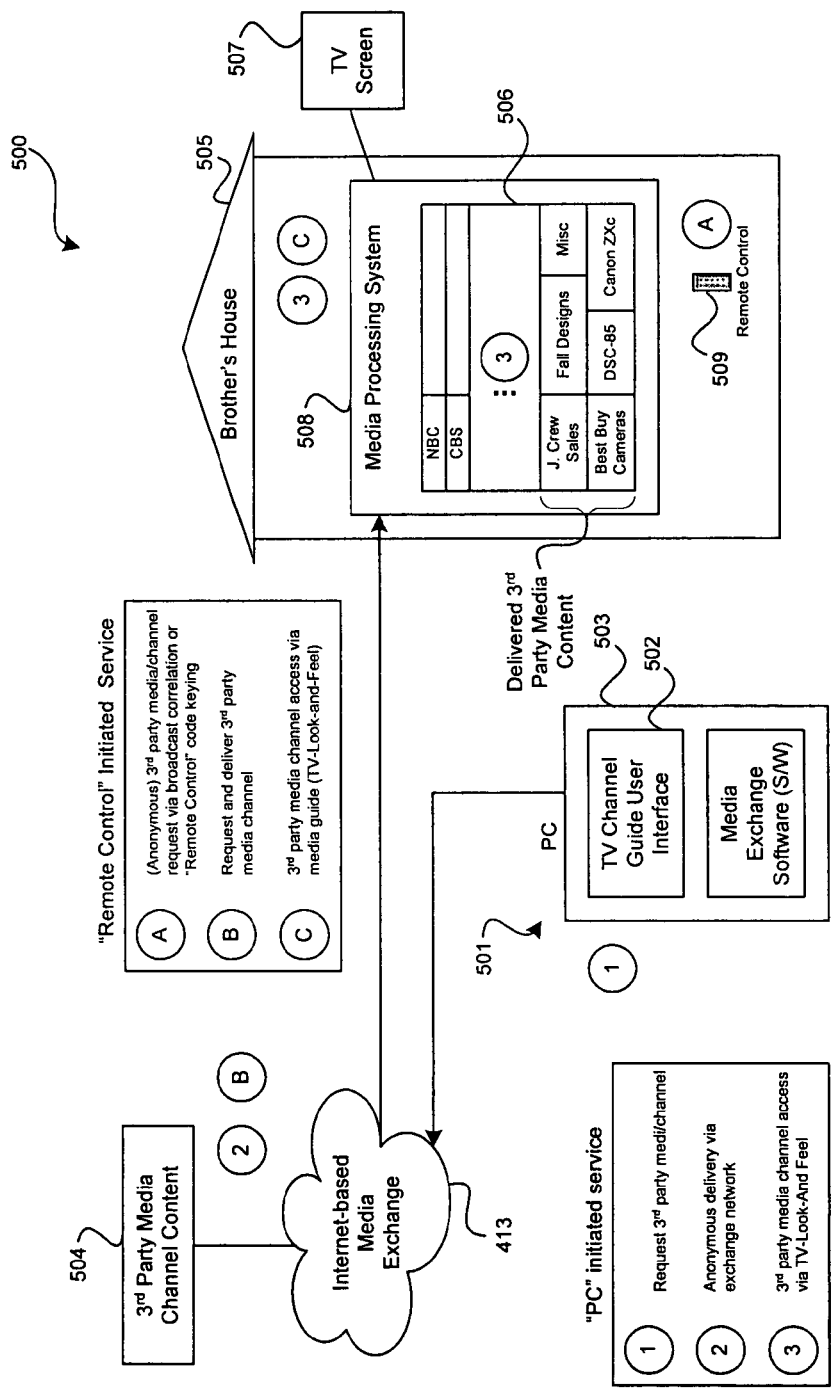
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an internet-based media exchange network 500 using a media guide user interface 502 on a PC 503. In step 2, an anonymous delivery of the requested third-party channel 504 is made to a second party 505 via the internet-based media exchange network 500. In step 3, the second party 505 accesses the third-party channel 504 using a media guide user interface 506 on a TV screen 507 that is integrated into an MPS 508.

Similarly, in step A, an MPS-initiated third-party request is made by a second party 505 via an internet-based media exchange network 500 using a media guide user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a media guide user interface 502 on a PC 503.

Figure 6:
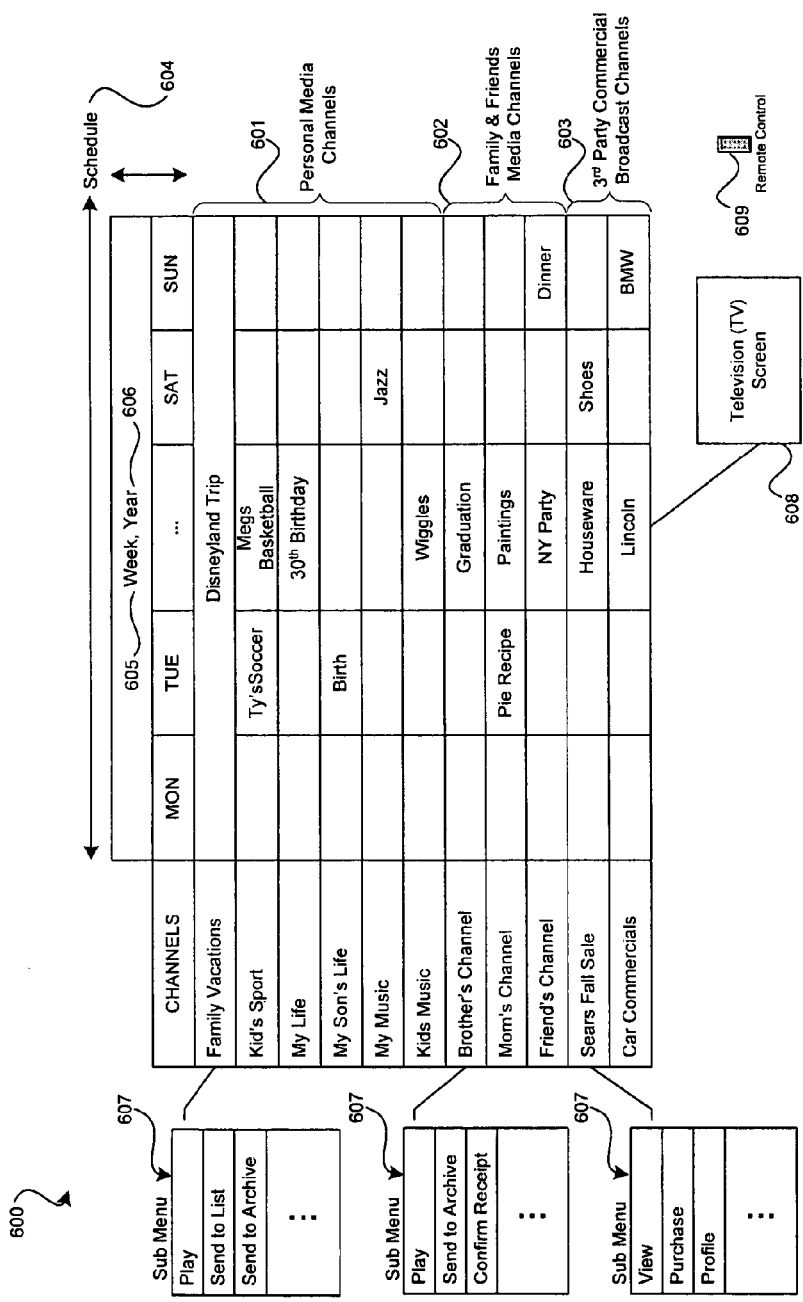
FIG. 6 is an exemplary illustration of a TV guide channel user interface in accordance with an embodiment of the present invention.

FIG. 6 illustrates a media guide user interface 600 in accordance with an embodiment of the present invention. The media guide user interface 600 may be displayed on a TV screen 608 and controlled by a remote control device 609. Also, the media guide user interface 600 may be displayed on a PC monitor and controlled by a keyboard or mouse.

The media guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
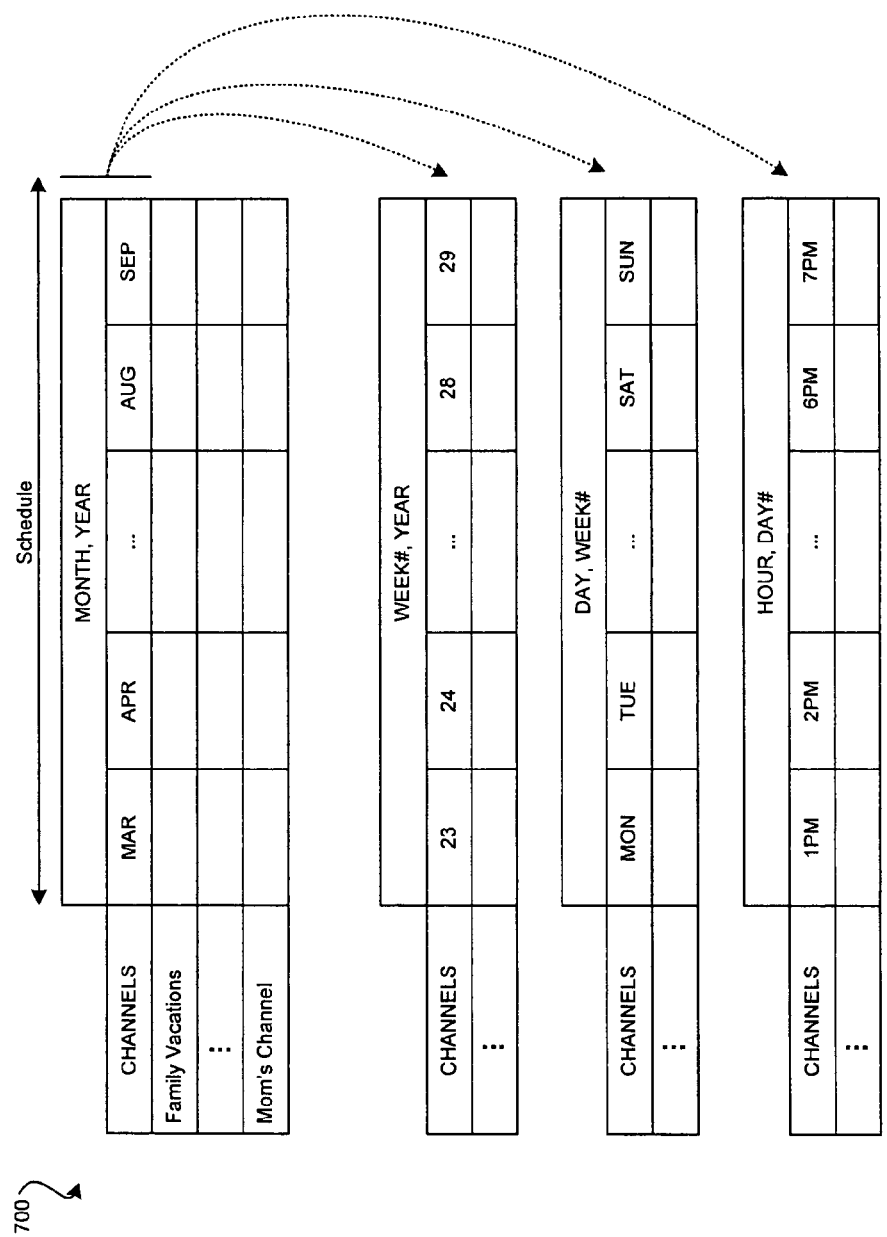
FIG. 7 is an exemplary illustration of several instantiations of a TV guide channel user interface of FIG. 4 in accordance with an embodiment of the present invention.

FIG. 7 illustrates possible multiple instantiations of a media guide user interface 700 in accordance with an embodiment of the present invention. The media guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The media guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
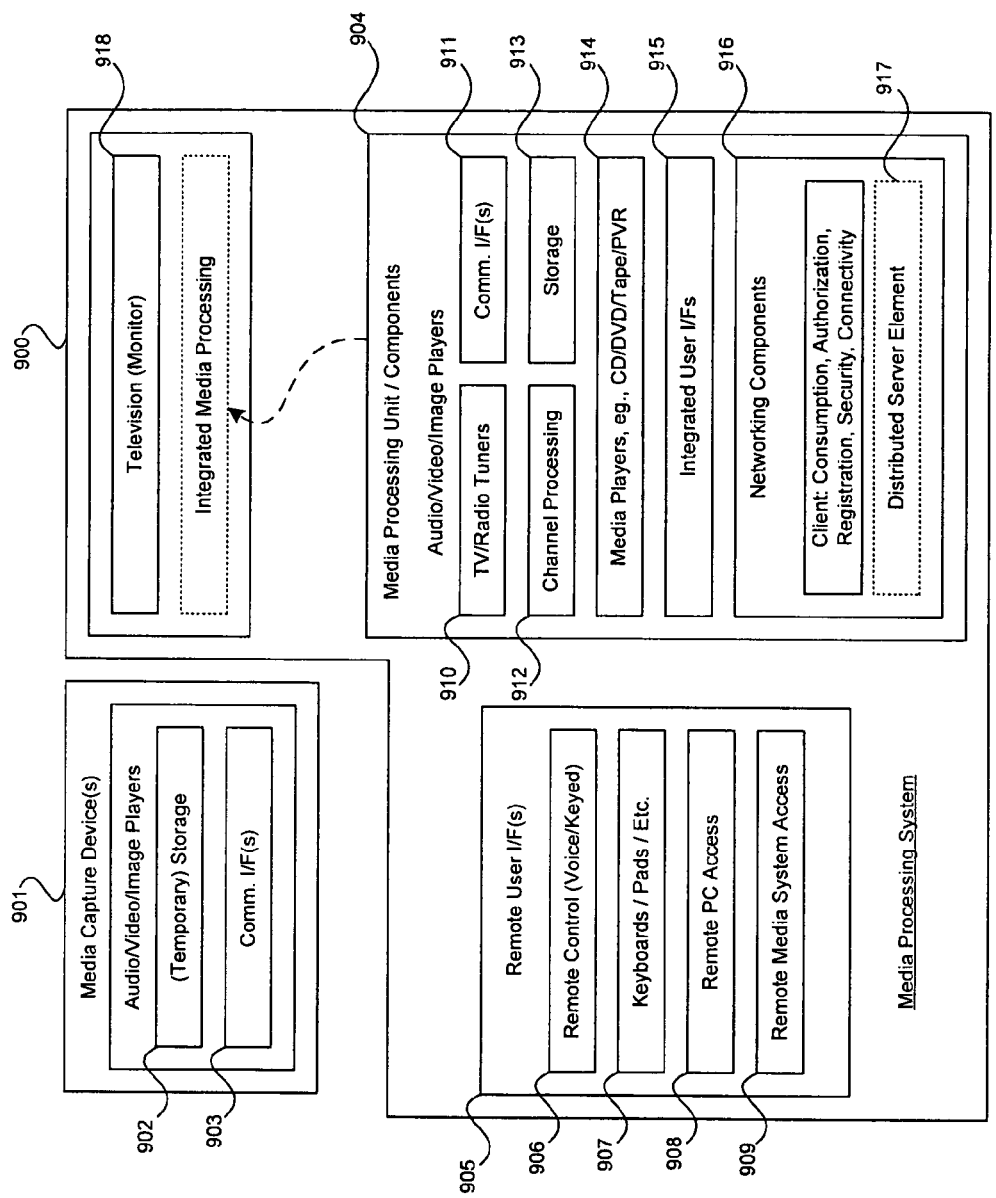
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

Figure 9B:
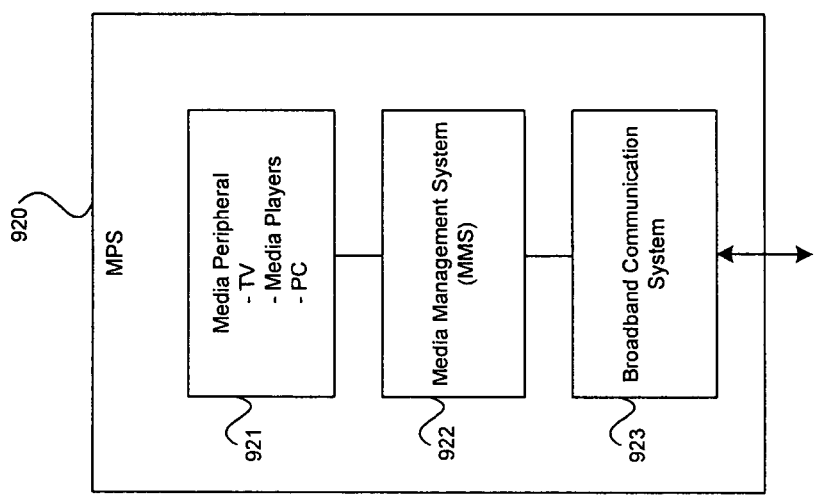
FIG. 9B illustrates an alternative embodiment of a media processing system (MPS) in accordance with various aspects of the present invention.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite headend.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
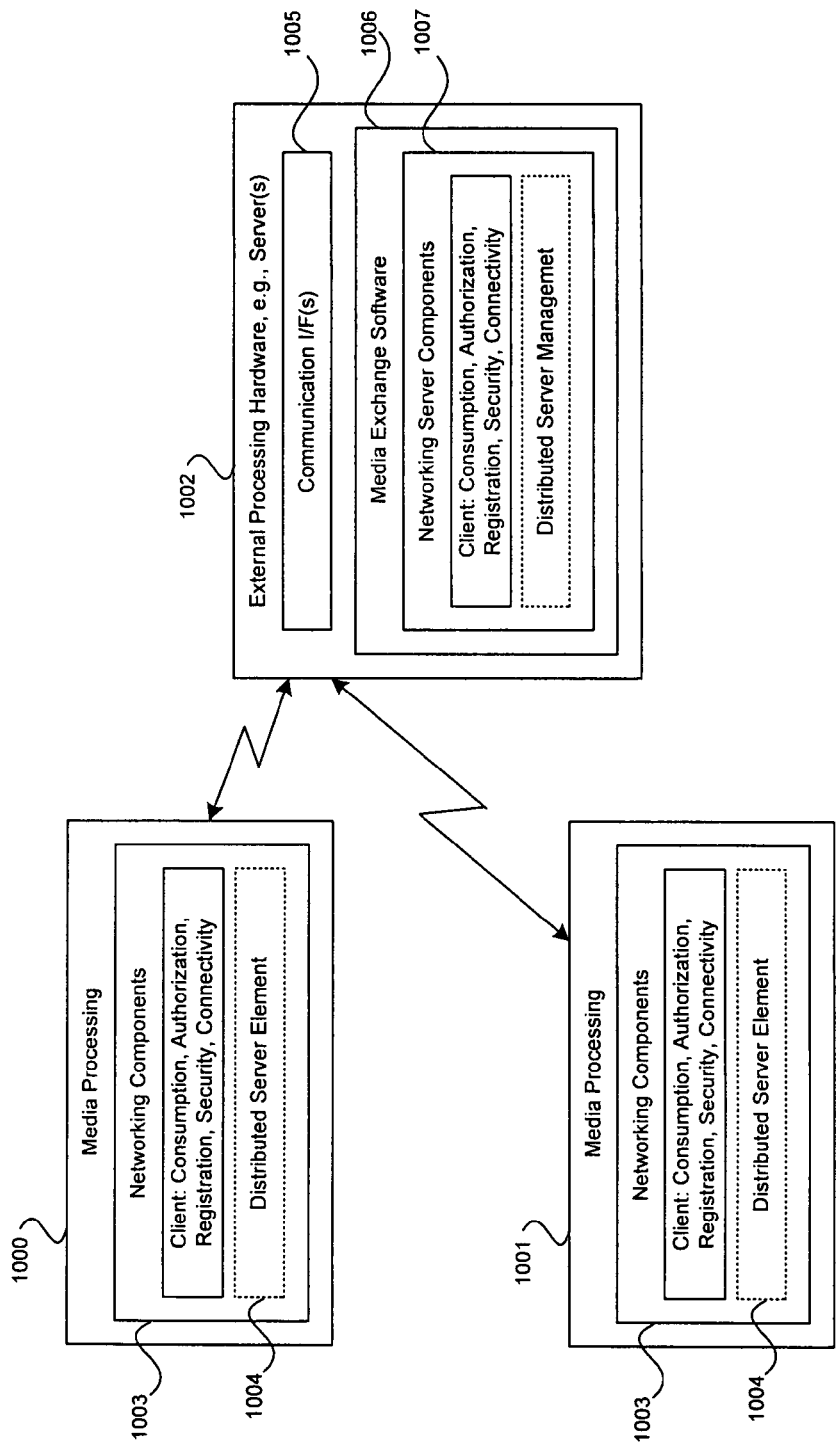
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
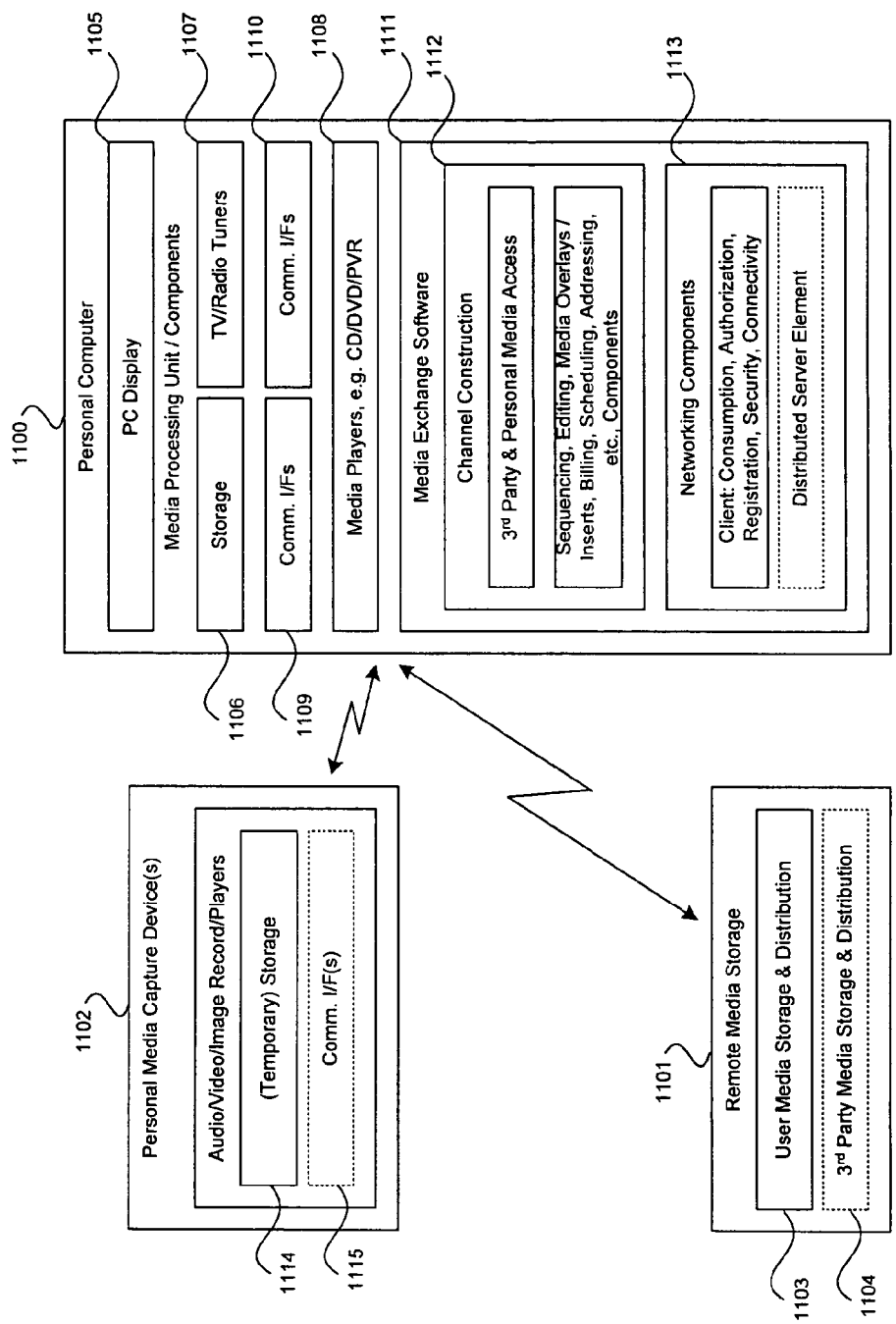
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 1100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9A. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

In another embodiment of the invention may provide a system for controlling the transfer of media content in a communication network. The system may comprise at least one processor that may be adapted to receive an input which specifies one or more media files that are to be transferred via a communication channel in the communication network. The processor may also receive a selection that specifies various quality of service (QoS) parameters that are to be utilized to facilitate the transfer of the media files via the communication channel. Accordingly, one or more of the media files may be transferred by the processor via the communication channel utilizing the quality of service selection. The processor may be a media processing system processor, a media management system processor, a computer processor, a media exchange software processor, and/or a media peripheral processor.

In accordance with an embodiment of the invention, the processor may transfer at least a portion of the specified parameters to a first communication device that is coupled to the communication network. The first communication device may be a broadband headend or a media server. The second device may use some or all of the transferred parameters to configure at least a portion of the communication channel.

In another aspect of the invention, the input received by the processor specifying one or more media files that are to be transferred may be generated from a media guide, channel guide or a device guide. In this regard, the received input selection may be generated from, for example, a television screen within a home on which the media guide, channel guide and/or device guide may be displayed. The processor may be further adapted to queue and/or buffer at least various portions of the selected media files during transfer of the media files.

A cost associated with the quality of service selections may be presented by the processor to a user via, for example, a television screen within a home. The processor may also be configured to vary the cost based on the selected parameters that are utilized to specify the selected quality of service. Exemplary parameters that may be utilized to transfer the selected media files may comprise, a resolution, color content, encoding type, encoding rate, compression type, display size, bandwidth required to transfer the selected media file, a time required for the transfer, and a cost of the transfer.

Accordingly, the present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for controlling communication of media content by a network device in a communication network, the system comprising:
    processing circuitry configured to select a media file from a plurality of media files associated with a plurality of different media sources for communication to a remote user via a communication channel, the selection based upon associated costs of the media file and at least one of media source characteristics, channel characteristics, and end user device characteristics;
    the processing circuitry further configured to receive a quality of service selection specifying a quality of service option and to calculate and display an associated cost for communicating the selected media file based at least in part on the quality of service selection; and
    the processing circuitry configured to communicate transmission parameters associated with the received quality of service selection and then the media file to the remote user utilizing the received quality of service selection.

2. The system according to claim 1, wherein the processing circuitry is configured to cause displaying of the plurality of quality of service options.

3. The system according to claim 1, wherein the processing circuitry is configured to transfer media file transfer parameters to a first communication device coupled to the communication network.

4. The system according to claim 3, wherein the processing circuitry causes configuring of at least a portion of the communication channel by a second device utilizing the transferred media file transfer parameters.

5. The system according to claim 3, wherein the first communication device is at least one of a broadband head end and a media server.

6. The system according to claim 1, wherein the processing circuitry is configured to one or both of queue and/or buffer at least a portion of the media file during the communicating.

7. The system according to claim 1, wherein the processing circuitry is configured to present a cost for the communicating of the media file via the communication channel utilizing the quality of service selection.

8. The system according to claim 7, wherein the processing circuitry is configured to vary the cost depending on the quality of service selection.

9. The system according to claim 1, wherein the quality of service selection for the communicating of the media file comprises at least one of: a resolution, color content, encoding type, encoding rate, compression type, display size, a bandwidth to be utilized for transfer of the media file, a time to be utilized for the transfer, and/or a cost for the transfer.

10. A method for controlling communication of media content by a network device in a communication network, the method comprising:
    selecting a media file from a plurality of media files associated with a plurality of different media sources for communication to a remote user via a communication channel, the selection based upon associated costs of the media file and at least one of media source characteristics, channel characteristics, and end user device characteristics;
    receiving a quality of service selection specifying a quality of service option and calculating and displaying an associated cost for communicating the selected media file based at least in part on the quality of service selection; and
    communicating transmission parameters associated with the received quality of service selection and then the media file to the remote user utilizing the received quality of service selection.

11. The method according to claim 10, further comprising causing display of the plurality of quality of service options.

12. The method according to claim 10, comprising transferring media file transfer parameters to a first communication device coupled to the communication network.

13. The method according to claim 12, comprising configuring at least a portion of the communication channel by a second device utilizing the transferred media file transfer parameters.

14. The method according to claim 12, wherein the first communication device is at least one of a broadband head end and a media server.

15. The method according to claim 10, comprising one or both of queuing and/or buffering at least a portion of the media file during the communicating.

16. The method according to claim 10, comprising presenting a cost for the communicating of the media file via the communication channel utilizing the quality of service selection.

17. The method according to claim 16, comprising varying the cost depending on the quality of service selection.

18. The method according to claim 10, wherein the quality of service selection for the communicating of the media file comprises at least one of: a resolution, color content, encoding type, encoding rate, compression type, display size, a bandwidth to be utilized for transfer of the media file, a time to be utilized for the transfer, and/or a cost for the transfer.

19. A system for controlling communication of media content by a network device in a communication network, the system comprising:

a media device configured to select a media file from a plurality of media files associated with a plurality of different media sources for communication to a remote user via a communication channel, the selection based upon associated costs of the media file and at least one of media source characteristics, channel characteristics, and end user device characteristics;

the media device configured to receive a quality of service selection specifying a quality of service option and to calculate and display an associated cost for communicating the selected media file based at least in part on the quality of service selection; and media device configured to communicate transmission parameters associated with the received quality of service selection and then the media file to the remote user utilizing the received quality of service selection.

20. The system according to claim 19, wherein the media device is configured to cause displaying of the plurality of quality of service options.

* * * * *